R. K. PALMER AND W. G. MILNE.
FLANGE BENDING MACHINE.
APPLICATION FILED JUNE 7, 1918.

1,366,331.

Patented Jan. 18, 1921.
7 SHEETS—SHEET 1.

Witnesses:
W. C. Smith

Inventors:
Robert K. Palmer
Winford G. Milne
By Jones, Addington, Ames & Seibold
Attys.

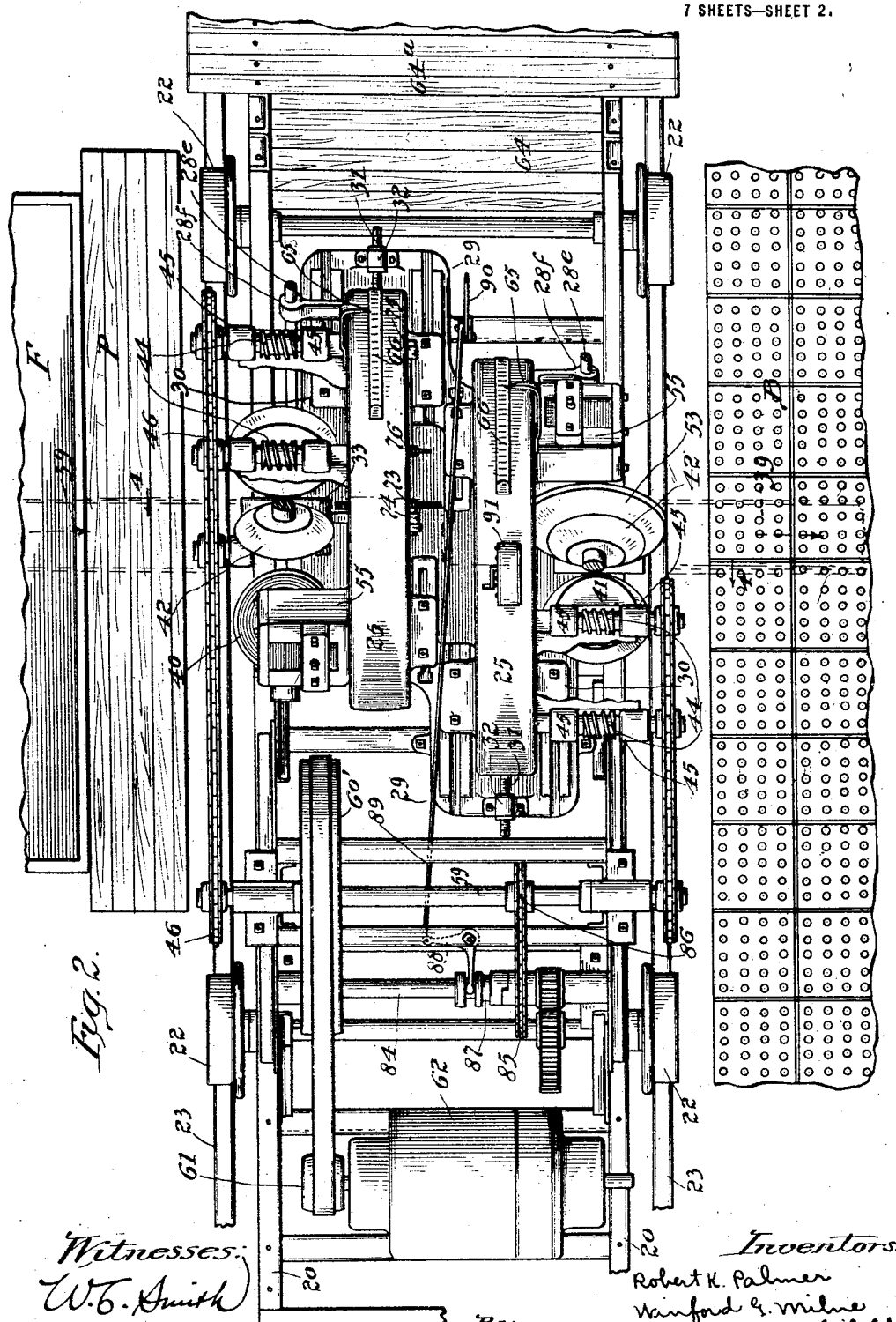

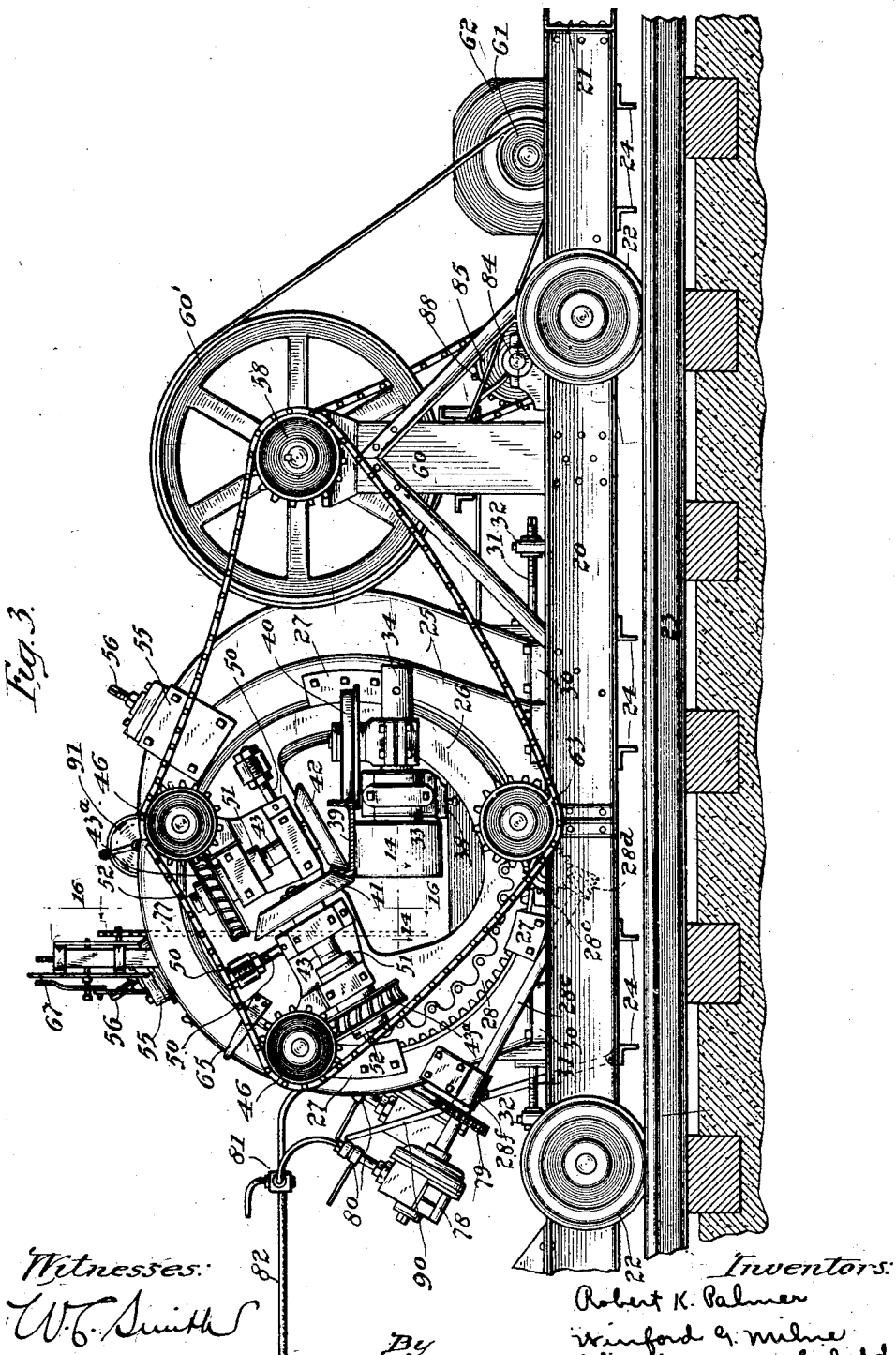

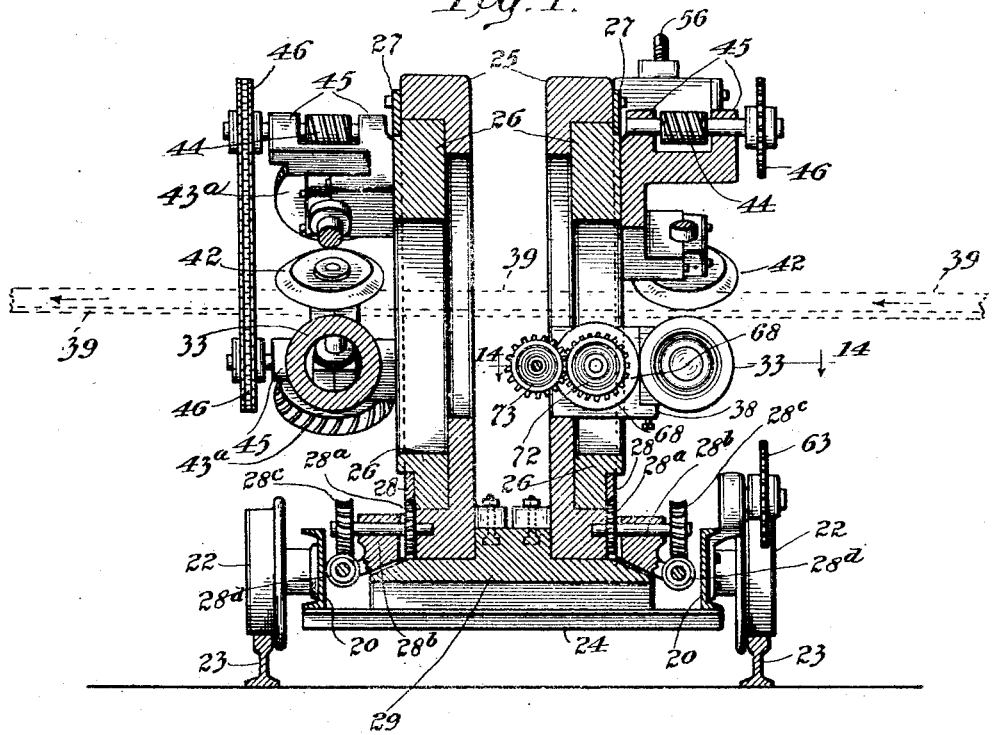

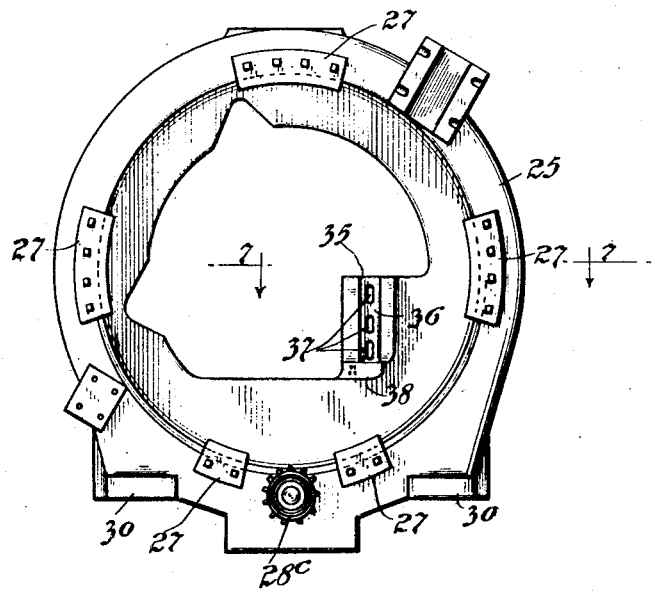
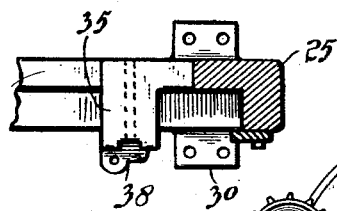
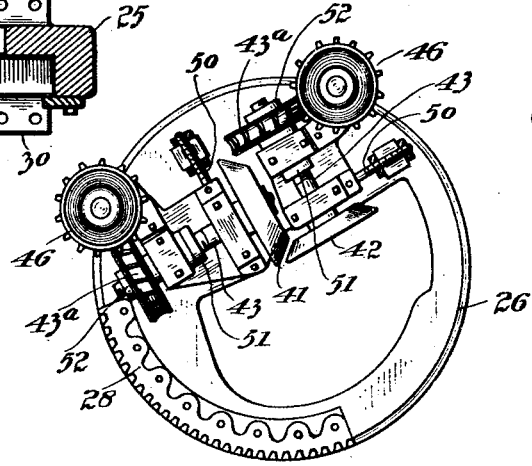

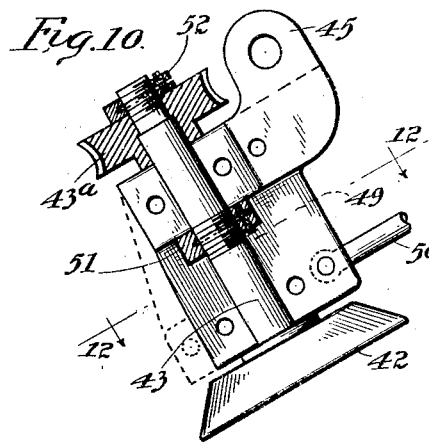
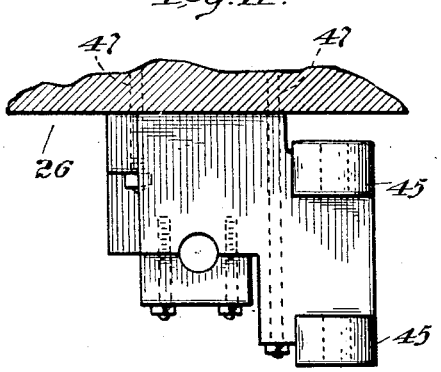
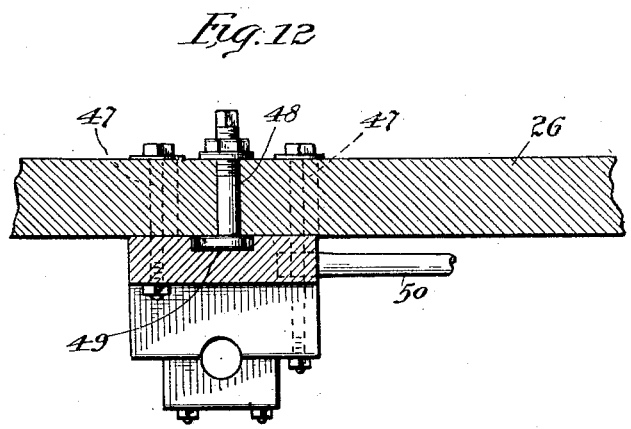
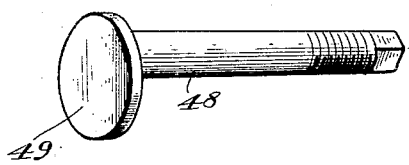

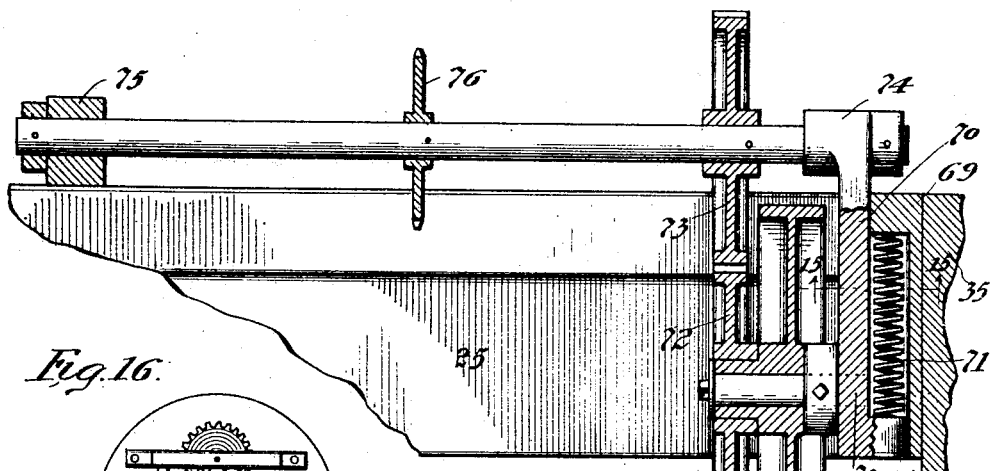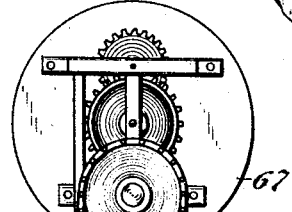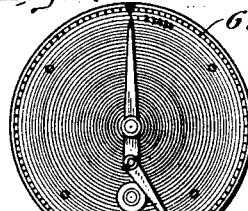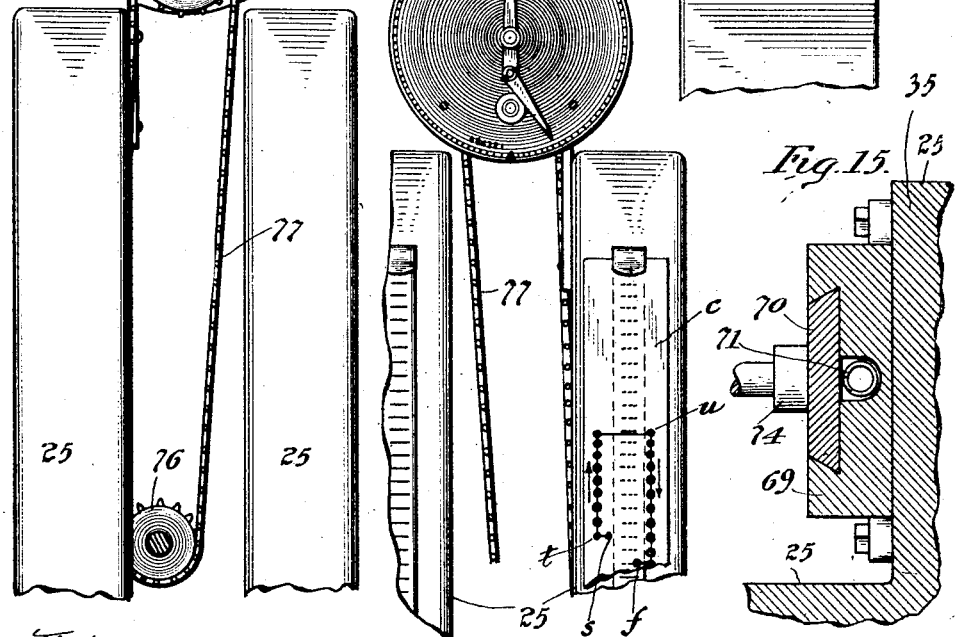

UNITED STATES PATENT OFFICE.

ROBERT K. PALMER AND WINFORD G. MILNE, OF HAMILTON, ONTARIO, CANADA.

FLANGE-BENDING MACHINE.

1,366,331.  Specification of Letters Patent.  Patented Jan. 18, 1921.

Application filed June 7, 1918. Serial No. 238,648.

*To all whom it may concern:*

Be it known that we, ROBERT K. PALMER, a citizen of the United States, and WINFORD G. MILNE, a subject of the Kingdom of Great Britain, residing at Hamilton, in the county of Wentworth and Province of Ontario, Canada, have invented certain new and useful Improvements in Flange-Bending Machines, of which the following is a full, clear, concise, and exact description, reference being had to the accompanying drawings, forming a part of this specification.

Our invention relates to machines for bending flanges, and particularly of channel bars such as are to be used for ship ribs.

In the framework of ships such bars are commonly placed vertically about two feet apart throughout the length of the sides of the ship with their webs in planes perpendicular to the central vertical plane of the ship, and with their flanges parallel to the outer surface of the ship, the plates forming the outer surface of the ship being riveted to the outer flanges of the said bars.

In this construction therefore, the angle of flange to web, particularly of those bars along either end of the ship, varies according to the location of the bar in the ship and from point to point along the bar or along certain portions of the bar.

When such bars come from the rolling mills, however, their flanges are perpendicular to the webs, and it has been common practice heretofore to bend such flanges by hand by means of specially formed pinch bars adapted to engage the flanges at any point while the web was held down flat on a suitable bed. By this means and repeated efforts and a large number of men, the flanges could be bent approximately to the desired angles. This method, however, has serious objections. It is slow and expensive, requires a large force of men, and the results obtained are not wholly satisfactory. The angles are apt to be inaccurate, the marks of the bending tools where they grip the hot flanges are liable to be left on the cooled bars as indentations, and it is difficult to prevent the outwardly bent flanges from bending on a line with the inside surface of the web thus leaving a depression or shallow groove along the outer face of this flange.

One object of our invention is to provide a machine capable of doing this work of bending the flanges of channel bars to any desired angle in an expeditious and satisfactory manner.

In carrying out our invention we provide means for bending both flanges at one and the same passage of the bar through the machine, which not only saves time but renders unnecessary the reheating of the bar with consequent expense, deterioration of the bar itself, and the possible deformation by the heat of the flange already bent. We also provide means whereby the position of the bending rolls relatively to the bar to vary the angle of the flanges to the web of the bar is under the control of the operator of the machine at all times so that the angle of bend may be varied without stopping the machine or the progress of the bar through the machine, and this may be accomplished simultaneously or independently with respect to the two flanges and in different degrees with respect to each. Suitable indicating devices are placed before the operator to inform him of the angle at which each flange is being bent at any moment, and the point at which the bar is being operated on at that time. Therefore by furnishing the operator with a chart or diagram showing the desired angles the flanges on any particular bar are to be given, he is enabled to control the machine to give the desired results.

Further objects and advantages will appear from the detailed description and claims to follow, reference being had to the accompanying drawings which illustrate one embodiment of our invention, and in which—

Fig. 2 is a plan view of the machine;

Fig. 3 is a side elevation of the side of the machine toward the furnace;

Fig. 4 is a vertical transverse section of the machine taken on the line 4—4 of Fig. 2;

Fig. 5 is a detail side elevation of one end of the machine showing the elevated platform extension of the main frame;

Fig. 6 is a side elevation of one of the stationary heads of the machine;

Fig. 7 is a detail sectional view on the line

Figure 1:
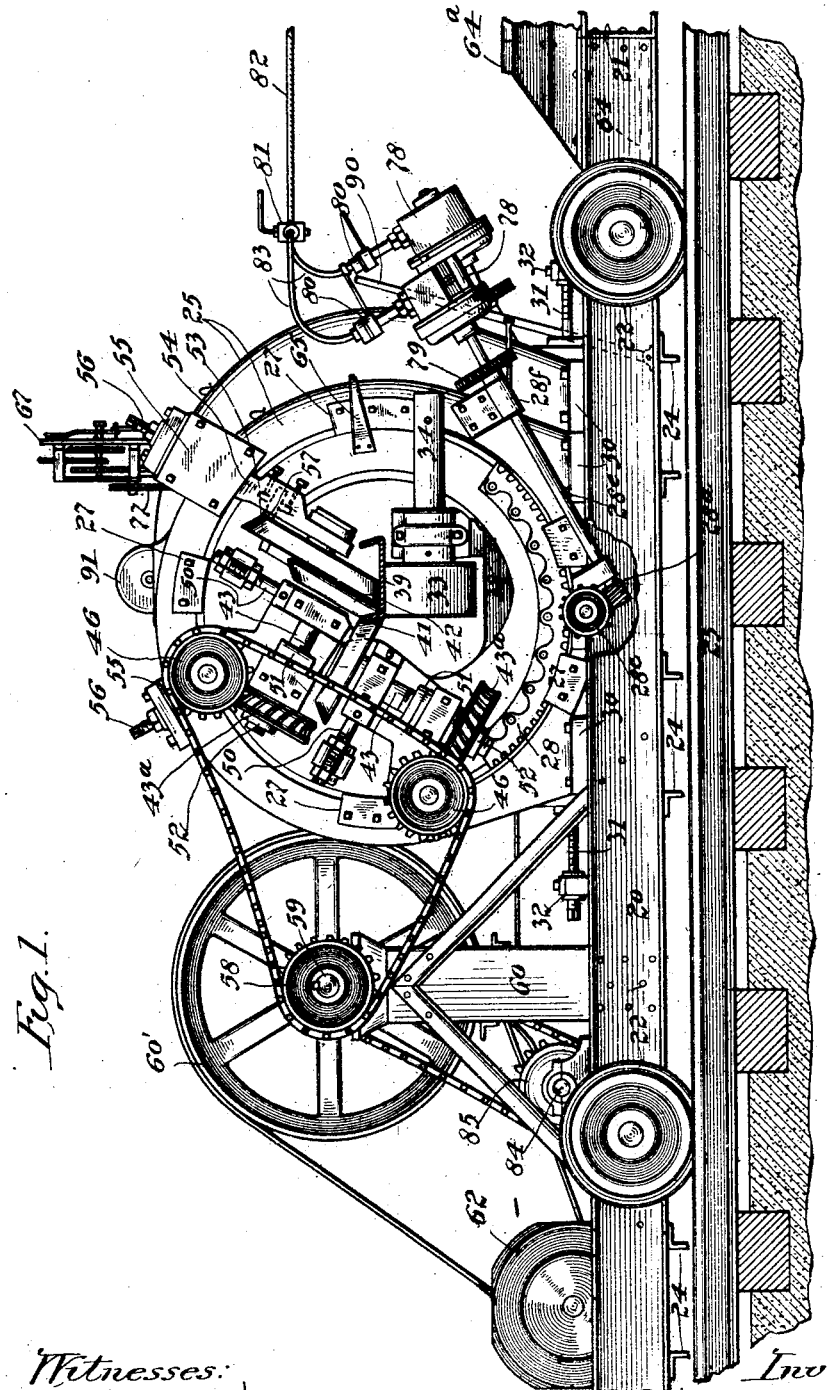
Figure 1 is a side elevation of the flange bending machine, looking at the side of the machine opposite the furnace.

7—7 of Fig. 6 showing the form of the projection extending from the stationary head toward the outside and on the end of which the supporting roller for the channel bar is mounted;

Fig. 8 is a side elevation of the rotating head with the bending rolls mounted thereon;

Fig. 9 is a detached view of the adjusting link of the supporting bracket for the bending rolls;

Figs. 10 and 11 are detail views of the bending roll supporting bracket;

Fig. 12 is a detail view of the adjusting eccentric for the bending roll bracket;

Fig. 13 is a detached view of said eccentric;

Fig. 14 is a detail view of a portion of the mechanism by which the indicator is driven for measuring the length of the bar as it travels through the bending rolls, said figure being a sectional plan view taken on the line 14—14 of Fig. 3;

Fig. 15 is a cross-section on the line 15—15 of Fig. 14; and

Figs. 16 and 17 respectively are back and front views of the indicator for measuring the distance the bar has traveled through the machine, and showing its relation to the two stationary heads of the machine.

Referring first to Fig. 2, the furnace indicated at F is used for heating the bars to the required temperature for bending, a suitable door or doors therefor being provided at the front end to enable the bars to be inserted and withdrawn. A small platform P is placed in front of the furnace at substantially the elevation of the door and furnace floor to assist in handling the bars. In front of this platform runs a track for the bending machine and on the other side of this track is the bending bed B which is at substantially the same elevation as the platform P and the charging floor of the furnace F, and is large enough to receive the bars as they come from the bending machine and on which they are bent to the desired longitudinal curvature.

The machine itself includes a traveling frame consisting of the side and end channel members 20 and 21 provided with flanged wheels 22 adapted to travel back and forth on the rails of the track 23 running between the bed B and furnace F or platform P. Extending across the lower side of this frame from side to side are the angle bars 24, secured to the lower flanges of the side channels, and serving to carry the major portion of the operating mechanism.

The flange bending mechanism comprises two substantially similar annular heads mounted vertically on the traveling frame near the center thereof, through the openings of which the channel bar passes flatwise, that is, with its web horizontal and its flanges vertical, as it comes from the furnace, to have its flanges bent to the desired angle or angles. Each such head carries the bending rolls—a pair in each instance—for one flange of the channel. These heads are placed side by side as close together as conveniently possible with the bending rolls on their outer faces and are off-set longitudinally of the machine about the width of the web of the bar to enable the two sets of rolls to operate on the respective flanges.

Each such head comprises a stationary cast head or ring 25 and a cast rotatable head or ring 26. The rotating head is mounted within the stationary head, as best seen in Figs. 1, 3 and 4, the outer head being recessed to receive the inner which is capable of a limited rotation therein, approximately ninety degrees in the particular machine illustrated. Suitable plates 27 are bolted to the outer face of the stationary ring and project over the adjacent edge of the rotating ring to hold the latter in place while permitting its rotation. A segmental rack-gear 28 is inset in and secured to the edge of the rotating ring 26, see Figs. 4 and 8, to enable power to be applied thereto to rotate the ring at the will of the operator of the machine. As shown in Figs. 1 and 4, a pinion 28$^a$ mounted on a stub-shaft carried in a lug or projection 28$^b$ from the stationary ring, meshes with the segmental rack 28. On the opposite end of this stub-shaft is a worm pinion or wheel 28$^c$, meshing with a worm screw 28$^d$ on the lower end of an inclined shaft 28$^e$, which is journaled in the lug 28$^b$ and in the bracket 28$^f$, bolted to the side of the stationary ring 25. This shaft may be operated in any suitable or desired way, but as hereinafter explained we prefer to do so by suitable pneumatic motors under the control of the operator. This worm gearing affords a large reduction in gear ratio without complication and is self-locking thereby holding the head in any desired position.

These two heads 25 are carried on and secured to a suitable sub-base casting 29 which in turn is supported by and bolted to the angle bars 24 of the main supporting frame of the machine. In order that these heads may be adjusted longitudinally to accommodate the machine to different widths of channel bars which in practice commonly vary from eight to twelve inches, the heads of the bolts passing through the feet 30 of the stationary heads 25 fit in suitable slots in the base 29, and a square ended screw 31 suitably secured at its inner end to the stationary ring and threaded through a lug 32 on the sub-base serves when turned to slide the corresponding head back and forth, the securing bolts being loosened for such adjustment and again tightened when the head is brought to the desired position.

In order to suitably bend the flanges of the channel bar as it passes through the machine, we provide each head with a pair of opposed driven rolls which grip one flange between them, and as the flanges are to be bent at different angles to the web these rolls are carried by the rotatable ring or head 26. We also provide an idler roller on each head for supporting the channel bar adjacent the bending rolls. The web of the bar, which remains horizontal during its passage through the machine, bears directly on this roller which accordingly must maintain its fixed position and is therefore carried by the stationary head or ring 25. These rolls and rollers are the same for both heads, but on the head for bending the flange inwardly, an additional pressure or thrust roller bearing on the opposite edge of the bar is provided to assist the bending rollers in taking the horizontal thrust due to the bending operation, and on the head for bending the flange outwardly an additional beveled roller bears directly on top of the web above the supporting roller and adjacent the bending rolls to keep the web down flat on the supporting roller. These additional rollers are likewise carried by the stationary or fixed heads 25.

Referring first to the supporting roller, it is marked 33, and rotates on the end of a pin or stationary stub-shaft 34, which is rigidly clamped to the end of a projection 35 (Figs. 6 and 7) extending from the stationary ring 25 through the opening in the inner ring 26 to a point slightly beyond the outer face of both rings. Suitable inner and outer clamping members, the inner having a rib fitting the groove 36 in the end of the projection to prevent rotation, receive and hold the pin or shaft 34, and are bolted to the end of said projection 35 by three bolts passing through the slots 37. An adjusting screw threaded up through a lower lug 38 on said projection serves to adjust the said clamp vertically. The web of the channel bar 39 rests on the top of this roller 33 as it passes through the head.

If, as we have shown, (see Fig. 3) the first head, that is, the head toward the furnace, is bending its flange inwardly, the opposite edge of the bar is braced by the thrust roller 40 which is journaled on a vertical axis suitably clamped to said pin or shaft 34. This roller is adjustable along said pin to accommodate different widths of bars. It is not needed on the opposite head (see Fig. 1) since the thrust is not in that direction. The pin 34 on the latter side is of the same length, however, and this horizontal wheel 40 can be supplied if needed or if the flange in that head is bent inwardly.

The pair of flange bending rolls 41 and 42, for each head, have beveled operating faces or edges and grip the flange to be bent between them. As the construction by which these are supported and operated are substantially the same, the detailed description of one will suffice.

The bending roll is suitably secured to the end of a shaft 43 journaled in bearings in a suitable bracket which is bolted to the outer face of the rotating ring or head 26. On the opposite end of this shaft is a worm wheel 43ᵃ which is driven by a worm 44 (Fig. 2) located on a cross shaft between the bearing lugs 45 on the same bracket as for the shaft 43. A sprocket wheel 46 on the end of this worm shaft receives the power to drive said roll.

This bracket construction is shown somewhat in detail in Figs. 8 to 13. It comprises a casting adapted to be bolted to the web of the ring 26 with its inner face against the outer face of said web and having suitable projecting lugs carrying the journal boxes for the shaft 43, parallel with the face of the ring, and the lugs 45 near the worm wheel end of said shaft carrying the worm shaft at right angles to said shaft 43 and to the plane of said ring 26.

This bracket may be adjusted to various positions to vary the distance between the rolls and their angular relation to accommodate them to different sections of flange to be operated on.

For this purpose the bolt holes 47 (Fig. 12) in the web of said ring 26 are enlarged so that when the securing bolts are loosened the bracket may be shifted somewhat. A stud 48 (Figs. 12 and 13) passing through the web of the ring 26 beneath said bracket and having an eccentric head 49 fitting within a similar depression in the bottom of the bracket serves when turned to shift said bracket slightly. A wrench or other tool applied to its squared inner end enables one to turn said stud 48. An eye-bolt or threaded link 50 (Figs. 8–11, 12) having its eye pivoted to one corner of the bracket and nuts on its threaded end engaging opposite sides of a suitable stud on the member 26 coöperates with said eccentric cam stud 48—49 in adjusting said roll bracket to the desired position and securing it in adjusted position.

The position of the bending roll can also be adjusted by shifting the shaft 43 endwise in its bearings. This is done by loosening the threaded split locking rings 51 and 52 (Fig. 10), or loosening one and tightening the other, and then again locking same in place.

By these various adjustments, the bending rolls can be properly positioned to secure the best results in bending the flanges. The center of rotation of the ring carrying the rolls is at the center of the corner of the flange being bent and the web of the bar. In practice it may be necessary slightly to raise the inner roll and depress the outer roll for the inward bend of the flange or the reverse for the outward bend. And one section of bar to be treated may require a little different adjustment from another, or where slight distortion of the outer face of web or flange necessarily results from the nature of the bend imparted to the flange, its occurrence in either place can be controlled according to which shall be desired to remain undistorted. The machine is therefore adapted to take care of all conditions found in practice.

The bending roll itself is preferably secured to its shaft 43 in a manner similar to the worm wheel 43ª, that is, by a suitable spline or key and slot connection and a split threaded ring on the outside. This construction makes for reliability and ease of removal for change in contour of section, or other purposes.

By the described arrangement of mechanism a very simple, strong and efficient drive is secured for said rolls. An inner beveled roll is practically necessary in order that the flange may be bent inwardly. The outer beveled roll coöperates therewith. The shafts of these two rolls are substantially at right angles. The worm gearing affords a simple means of securing a large gear reduction and the bringing out of the driving sprockets to the same plane on the outer face of the machine. Substantially the same construction, including the bracket and the parts mounted on it, serves for both rolls and both heads.

In the second head, (Fig. 1) the opposite flange is shown being bent outwardly. The two beveled rolls are here shifted around to the opposite side of the ring. The construction, however, remains the same. When the flange is bent in this direction there is a tendency for the web of the bar to bend up adjacent the rolls. To guard against this we provide an addional roll or roller 53, which is beveled on its operating face and mounted on an inclined support to enable it to bear close up to the inner bending roll and at the same time not interfere therewith. This pressure roll is journaled at the end of a supporting bar 54 which is adjustably clamped on the housing projections 55 extending outwardly from the stationary head 25. This bar 54 is suitably and adjustably clamped in said housing 55 so that it may effectually hold down the web of the channel bar. It is adjusted endwise by the bolt 56. A friction roller 57 in the bar or arm 54 supports the rear face of roller 53. A similar housing is provided on the other head 25, though the roll is not used since it is not needed when the flange is being bent inwardly.

The rolls on each head are driven by independent sprocket chains from the sprockets 58 on the opposite ends of a shaft 59 mounted on the posts 60 secured at their lower ends to the side channels of the machine frame. This shaft carries a large belt pulley 60' connected by a driving belt with the much smaller pulley 61 of the motor 62, preferably electric, mounted on the adjacent end of the machine frame.

On the side of the machine opposite the furnace, shown in Fig. 1, the sprocket chain passes directly around these three wheels, which are so located that the distance around remains substantially constant for any position of the wheels 46 within the limits of the machine. On the furnace side of the machine as shown in Fig. 3, the rolls and sprockets 46 are on the opposite side of the center of the rotating head. An idle sprocket 63 is therefore mounted on a bracket secured to the outer side of channel 20. This arrangement prevents the chain from interfering with the channel bar 39 and the distance around the four wheels remains substantially constant, so that said rolls are satisfactorily operated in any position to which they may be adjusted within the limits of the machine without interfering with the travel of the channel bar therethrough, and without disconnecting or readjusting the driving mechanism of said rolls.

By thus positively driving the bending rolls, the tractive power for pulling the bar through the machine is not dependent on the weight of the bar as would be the case if for instance the roller 33 were driven and relied on for this purpose. Positive traction is thus obtained by the pressure between the bending rolls. This tractive power may of course be supplemented, if necessary or desired, in order to handle heavy or other bars, in any suitable way, as for instance by equipping the furnace with suitable devices to push or pull the bar out or to jar and loosen the same from the floor of the furnace and start it into the machine. Any suitable mechanism may be employed for this purpose, or hand power be relied on.

The machine frame is provided with an operator's platform 64, (Figs. 1, 2 and 3) consisting of a flooring filled in between angle irons secured to the inside faces of the side channels 20. From this point the operator is enabled to control the operation of the entire machine.

The machine is also equipped with a platform 64ª, extending from the rear end thereof. This platform is of a substantial length, so as to serve as a charging platform in front of the furnace, has the same elevation as the platform P and bed B, and is of a width such that when the machine is withdrawn or moved away from the front of said furnace, the platform 64ª will just abridge the gap between the platform P and the bed B. The platform 64ª, consequently serves as a convenient working floor for transferring the long channels from the bed B to the furnace F. Where there is a battery of furnaces, the platform fills the gap in front of one furnace while the bending machine is working on a bar at the adjacent furnace, so that bending and charging can go on simultaneously. The platform also enables the bending machine operatives and attendants to cross readily and quickly from one side of the machine to the other, as may be necessary in the operation of the machine, and while it is operating to see that the rolls and the other parts are properly functioning, and to make adjustments and the like. It also serves as a convenient step or platform for the main operator of the machine, who otherwise would find it difficult and perhaps dangerous to step directly from his platform to either side platform when he had to reach the side of the machine quickly for any purpose. When dealing with red hot bars which must not be allowed to cool before the operation is completed, and which are dangerous to approach too closely, the matter of time and safety in handling the same becomes an important consideration. The adjacent edge of this raised platform also affords a convenient shelf for the operator's emergency tools, his mask, goggles, gloves, etc., all of which are thus close at hand when needed, even though the machine be shifted back and forth in position.

In order that the operator may know the angle of operation of the bending rolls, a pointer 65 is secured firmly to the inside ring 26 with its indicating end projecting over the curved flattened outer edge of the stationary ring or head 25 in front of the operator's platform. A suitable scale 66 graduated in degrees from the normal or vertical position or otherwise is preferably affixed to each head beneath the pointer. These indicators show to the operator the position at all times of the heads and rolls and accordingly the angles, if any, at which the respective flanges are being bent.

Another indicator is provided to show how far the bar has traveled through the machine at any moment. That is, the point or points at which each pair of bending rolls is operating on the flange of the bar, measuring from the end of the bar. This indicator is indicated generally by the number 67 in Figs. 1 and 3 and is in convenient view from the operator's position. It is shown more in detail in Figs. 14 to 17. In order to accomplish this result we make use of the idle supporting roller 33 on the first head, toward the furnace. This roller rotates only when a bar is in contact therewith and rotates with the bar. The indicator referred to, therefore, is connected with this roller to measure its surface travel.

Fig. 14 shows a portion of this roller 33, a friction roller 68 pressing against the surface thereof, said figure being a sectional plan of the parts. Fig. 4 shows in elevation the location of this friction roller with reference to the roller 33. A suitable bracket 69 is bolted to the vertical face of projection 35 from the stationary head 25, and carries a slide 70 which is pressed toward the roller 33 by a coiled spring 71 in said bracket. A pinion 72 is carried by the friction wheel 68 which meshes with another pinion 73 on a shaft journaled at one end in bearing 74 on slide 70, and at the other end to a bracket 75 secured to the inner face of the head 25. A sprocket wheel 76 connected by chain 77 (Fig. 16) to the indicator 67 causes the latter to show the number of feet the first flange has traveled through the machine. As seen in Fig. 17, the face of the dial is graduated so that once around represents 100 feet. It is divided into halves and has two pointers, each half being numbered from 0 to 50. Such bars usually come in fifty foot lengths. The lower pointer is preferably jointed so that by means of a thumb nut the lower end can be set back or ahead, as the case may be, to represent the position of the other set of rolls than that with which the indicator is connected. By thus setting this hand, the position of that set of rolls on the flange can be seen and told at a glance. The pointer as a whole is held on its spindle by friction, so that it can be reset readily to the zero point. Any suitable indicator may be used, it being necessary merely that the surface travel of the roller 33 be translated into feet and fractions thereof on the dial. Further description is believed unnecessary.

The operator of the machine is thus informed at all times at what points on the flanges the two sets of rollers are working, and at what angles said flanges are being bent.

By operating the inclined worm shafts 28 in one direction or the other, the operator can vary the angle of operation of the bending rolls, i. e. the angle at which they are bending the flange, at any desired time and to any extent within the limits of the machine. Various methods may be employed to rotate these shafts. Each may be provided with a hand wheel merely and be operated manually. But we prefer at present to employ small reversible pneumatic motors operated by compressed air. Each head is provided with such a motor, marked 78, and connected with the corresponding shaft 28ᶜ by suitable reducing gearing 79, the said motor and gearing being suitably supported by brackets or in other desired manner from the corresponding stationary head 25. An air valve 80 for each motor, one on either side of the operator, in convenient reach of his hands as he stands on the platform in position to see the three indicators, enables him to vary at will, and independently of each other, the angle of operation of the bending rolls. A single valve 81 may be used by the operator to control the two heads simultaneously, but ordinarily the independent valves are used. We have indicated the air pressure supply pipe more or less diagrammatically at 82, branching as at 83 to the individual motors. In practice suitable pipes, out of the operator's way, would be used, as is well understood by those skilled in the art, sufficient flexibility being provided to permit the said heads to be adjusted back and forth by the screws 31.

In order to reduce the mental work of the operator in bending the flanges at the proper angles, we provide each head with a chart for the particular flange being bent therein, said chart having printed thereon a scale of degrees corresponding to the scale already affixed to the head, and secure said chart to the head over the scale by suitable spring clips at each end of the head scale. When the chart is in position, the degree marks are in the same position as on the scale. These degree marks are preferably on the center line of the chart, the zero point on both scales being toward the lower end of the scale. These marks indicate the number of degrees from the perpendicular that the rolls are operating to bend the flanges.

A special line is drawn on this chart to indicate the varying degrees to which the flange is to be bent. At the left of the scale the increasing angles are indicated, and at the right the decreasing angles. Referring to Fig. 17, the manner of marking this chart is indicated. The chart itself is indicated at $c$. The line to be followed in bending the flange is marked at the point $s$ with the word "Start." Before the bar is allowed to enter the rolls, the head is moved so that its pointer stands at this position on the chart. The short horizontal line to the left of the point $s$ indicates that the flange is to be maintained at this angle for a certain distance, and this distance is marked in feet on the chart at the point $t$. The vertical line from the point $t$ indicates that the angle of the flange is to be increased. The rate of this increase is shown by marking the points in feet on this line at the various dots shown in the drawing opposite the degree marks, so that the operator merely watches the central dial 67, and when that shows that a certain point has been reached on the bar the pointer on the head should be at the same number of feet on the chart line. Of course the operator knows that the bend must be gradual from one distance mark to the next so that he moves the pointer gradually to bring it to the proper points on this mark in synchronism with the pointer on the dial 67. The horizontal line at the upper end of this vertical line indicates that that angle is to be maintained for a certain distance, and since it is thereafter to be reduced, the said line is carried over to the right of the scale. The distance in feet at which this angle is to be maintained is marked at the point $u$. The same method is pursued with respect to the descending line on this side of the scale, the angle being gradually reduced according to the marks in feet on said line until the lower end is reached, and if that angle is then to be maintained until the end of the bar is reached, the line is extended horizontally and is marked with the word "Finish" at the point $f$. By using such a chart as this on each head, the operator merely watches the central dial 67 indicating the number of feet the bar has traveled through the machine and then keeps the pointer of each head at the corresponding feet marks on the chart line.

It is sometimes found in practice that the flange on the outside of a longitudinal curve in the bar tends to straighten up somewhat when the bar is bent, particularly if the curve is of short radius. Under these circumstances the experienced operator can increase slightly the bend given to the flange at the proper points to allow for such action when the bar itself is bent.

The operator is also provided at his station with suitable means of any desired type to connect the motor 62 to the wheels of the car to propel the same. This in the instance shown in the drawing is accomplished by a gear and pinion connecting the axle of the wheels 22 near the motor to a cross shaft 84 journaled in bearings at either end on the side channel 20 of the frame. This cross shaft carries a loose sprocket wheel 85 connected by chain to a sprocket 86 on shaft 59 which as previously explained is driven by the motor. A clutch 87 serves to connect this sprocket 85 with the shaft 84 to propel the machine, the clutch being operated by the bell crank lever 88, and rod 89 running to the hand lever 90 pivoted near the operator's platform. By this means the operator can propel the machine as desired, the motor being reversible. Any other suitable means may be employed for this purpose. A double faced friction clutch, for example, together with suitable connecting gearing may be employed to propel the machine in either direction without reversing the motor.

The motor is stopped, started and reversed by means of a suitable controller operated from the operator's platform. This controller is indicated at 91 though it will be understood that it may be located in any desired place and be of any desired suitable type.

It is believed that no further description of the operation of the machine need be given. While we have thus shown and described one specific embodiment of our invention, it will be understood that various changes, alterations and modifications may be made therein without departing from the spirit of the invention or scope thereof as set forth in the appended claims.

We claim:

1. In a machine for bending the flanges of structural iron channel bars, the combination with a pair of bending rolls for one flange of the channel bar, of a second pair of bending rolls for the other flange of the channel bar, one of said pair of rolls being supported in advance of the other pair, and means for adjusting said rolls.

2. In a machine for bending the flanges of structural iron channel bars, the combination with a pair of rolls for each flange of the channel bar constructed and arranged to grip and bend the flange between them, of means for bodily adjusting said pairs of rolls to different angular positions to bend the flanges of the bar to different angles.

3. In a machine for bending the flanges of structural iron channel bars, the combination with a pair of rolls for each flange of the channel bar, of means to bodily adjust each said pair of rolls to different angular positions to bend each said flange either outwardly or inwardly at one passage of the bar through the machine.

4. In a machine for bending the flanges of structural iron channel bars, the combination with a pair of gripping and bending rolls for each flange of the channel bar, of means to bodily adjust the angular position of each said pair of rolls to bend one flange of the channel bar outwardly and the other flange inwardly at one passage of the bar through the machine.

5. In a flange bending machine, the combination with bending rolls for each flange of a channel bar, of means for operating said rolls to bend both flanges in a single passage of the bar through the machine, and means for independently varying the angle of operation of the bending rolls for each said flange while the bar is in motion in its passage through the machine.

6. In a machine for bending the flanges of a channel bar, the combination with bending rolls for each flange, of means for feeding a channel bar through the machine and simultaneously bending both of its flanges, and means for independently varying the angle of operation of the bending rolls for each flange at the will of the operator during the passage of the bar through the machine, whereby either flange may be bent to any desired angle.

7. In a flange bending machine, the combination with two sets of bending rolls for the opposite flanges of a channel bar, of means for driving said rolls whereby they serve also as feeding or traction rolls, and means for varying the angle of operation of said rolls during the passage of the bar through the machine.

8. In a flange bending machine, the combination with two heads, of a set of flange bending rolls mounted on each head, one set for each flange of a channel bar, means for independently varying the angle of operation of each said set, and means for shifting the two heads relatively to accommodate said sets of rolls to channel bars of different widths.

9. In a flange bending machine, the combination with a stationary annular head, of a rotating annular head mounted within said stationary annular head, said rotating head bearing at its periphery in said stationary head, flange bending rolls mounted on said rotatable head and projecting toward its center, supporting means for a flanged bar to pass the same through the openings of said heads and in position to have its flange bent by said rolls, and means for rotating said head to vary the angle of operation of said rolls.

10. In a flange bending machine, the combination with two heads, each head comprising a stationary ring, a movable ring mounted within said stationary ring, and a pair of bending rolls mounted on said rotating ring, operable to pass a channel bar through said movable rings of both heads, the bending rolls of one head operating upon one flange of said channel bar and the rolls of the other head operating on the other flange of said bar, and means for rotating said rings during the passage of the bar through the heads to vary the bend imparted to the flanges.

11. In a flange bending machine, the combination with a stationary head, of a rotating head carried thereby, a pair of bending rolls carried by said rotating head and adapted to grip the flange of a bar between them, a shaft for each said roll, a worm wheel on the opposite end of said shaft, a worm meshing with said wheel, a sprocket on the shaft of said worm, said shafts, worm gearing and sprockets all carried by said rotating head, a stationary driving sprocket, the distance around all said sprockets being substantially constant in all positions of the rotating ring, and a single sprocket chain connecting all said sprockets to drive said rolls.

12. In a flange bending machine, the combination with a set of bending rolls for each flange of a channel bar, of a roller operated by the channel bar in its passage through the machine, an indicator connected with said roller, said indicator showing the extent of travel of the bar through each said set of bending rolls.

13. In a flange bending machine, the combination with a set of flange bending rolls for each flange of a channel bar, of means for varying the angle at which said rolls operate to bend the flanges, said means being operable during the passage of the bar through the machine and without stopping its travel, and indicating devices to show the position at which each said set of rolls is operating at any and all times.

14. In a machine for simultaneously bending the flanges of channel bars, means for bending each flange of the bar, means under the control of the operator for independently varying the angular position of the respective flange bending means at any time without stopping the machine, and indicating devices at the operator's position showing the position in the length of the bar at which the bending means are operating at any time and for showing the angles at which the respective flanges are being bent at the corresponding time.

15. In a flange bending machine, the combination with a stationary head, of a rotatable head, flange bending rolls carried by said rotatable head, a pointer secured to the rotatable head, a chart over which said pointer moves corresponding to the angle of operation of said rolls, said chart showing the angular position the pointer should assume at various points along the bar, and means for indicating the points in the flange at which said rolls are operating.

16. In a flange bending machine, the combination with a pair of flange bending rolls arranged to grip a flange to be bent on its opposite faces, of a supporting bracket for each roll, a support for said bracket to which the same is bolted, a rotatable stud extending through said support and having an eccentric head in the base of said bracket, and a threaded link connected on the face of said support to the edge of said bracket, said stud and link serving to adjust said bracket to various positions to correspondingly adjust the said roll.

17. In a flange bending machine, the combination with a pair of heads, of a pair of traction bending rolls mounted on each head, one pair for each flange of a channel bar, a sprocket for each roll, a power driven sprocket for each head, and a single sprocket chain for each head connecting all said sprockets.

18. In a flange bending machine, the combination with a pair of bending rolls for one flange of a channel bar and arranged to bend the said flange inwardly, of a thrust roller engaging the web of said bar on the opposite edge and opposite the point at which the bending rolls are working to assist in maintaining sharpness in angle at the point of the bend in the flange being bent.

19. In a flange bending machine, two rotatable heads, one in advance of the other, flange bending rolls on each head, one set of rolls for each flange of a channel bar, worm gearing for turning each said head, said gearing affording a large reduction ratio and self-locking means for the heads, and means for operating said gearing to rotate said heads.

20. In apparatus of the class described, a heating furnace, a bending bed, a track between said furnace and bed, a flange bending machine on said track adapted to travel back and forth thereon, the operating position of the flange bending mechanism of said machine being substantially at the same elevation as said furnace and bed, and a raised platform at one end of said machine to bridge the gap between the said bed and furnace.

21. In a machine for bending the flanges of channel bars, the combination with a supporting frame mounted on wheels adapted to run on a track, of an operator's platform on said frame, a bending mechanism comprising means for simultaneously and independently bending the two flanges of the bar, a motor on said frame for operating said bending mechanism, indicating devices adjacent the operator's platform for showing the position of the bar in the machine and the angle to which the flanges are being bent, and controlling devices within reach of the operator to enable him to control the operation of the machine for bending and for propelling it.

22. In a machine for bending the flanges of a channel bar, in combination, a pair of bending rolls for one flange of the channel bar, a second pair of bending rolls for the other flange of the channel bar, the second pair of rolls being supported in advance of said first pair of rolls, and independent means for simultaneously angularly adjusting each pair of bending rolls.

23. In a flange bending machine, the combination with a pair of flange bending rolls arranged to grip a flange to be bent on its opposite faces, of a shaft on which each roll is mounted, a supporting bracket for each shaft, a support to which said brackets are secured, means to adjust the position of each said shaft longitudinally in its bracket, and means to adjust the position of said brackets on said support, whereby the said rolls may be readily adjusted to grip flanges of different thicknesses and with faces of different angles of inclination.

24. In a machine for bending the flanges of structural iron channel bars, the combination with a pair of bending rolls for one flange of the channel bar, of a second pair of rolls for the other flange of the channel bar, means for angularly adjusting each pair of bending rolls to bend the corresponding flange at the desired angle, and means to laterally vary the distance between said pairs of rolls to accommodate the same to different widths of channel bars.

In witness whereof we have hereunto subscribed our names.

ROBERT K. PALMER.
WINFORD G. MILNE.

Witnesses:
R. T. MacDonald,
A. J. Moore.